April 29, 1941.  H. E. MORTON  2,239,927
CUTTING AND SHAPING MACHINE
Filed Jan. 3, 1939  5 Sheets-Sheet 1

Inventor
Henry Earl Morton,
by
Attorneys

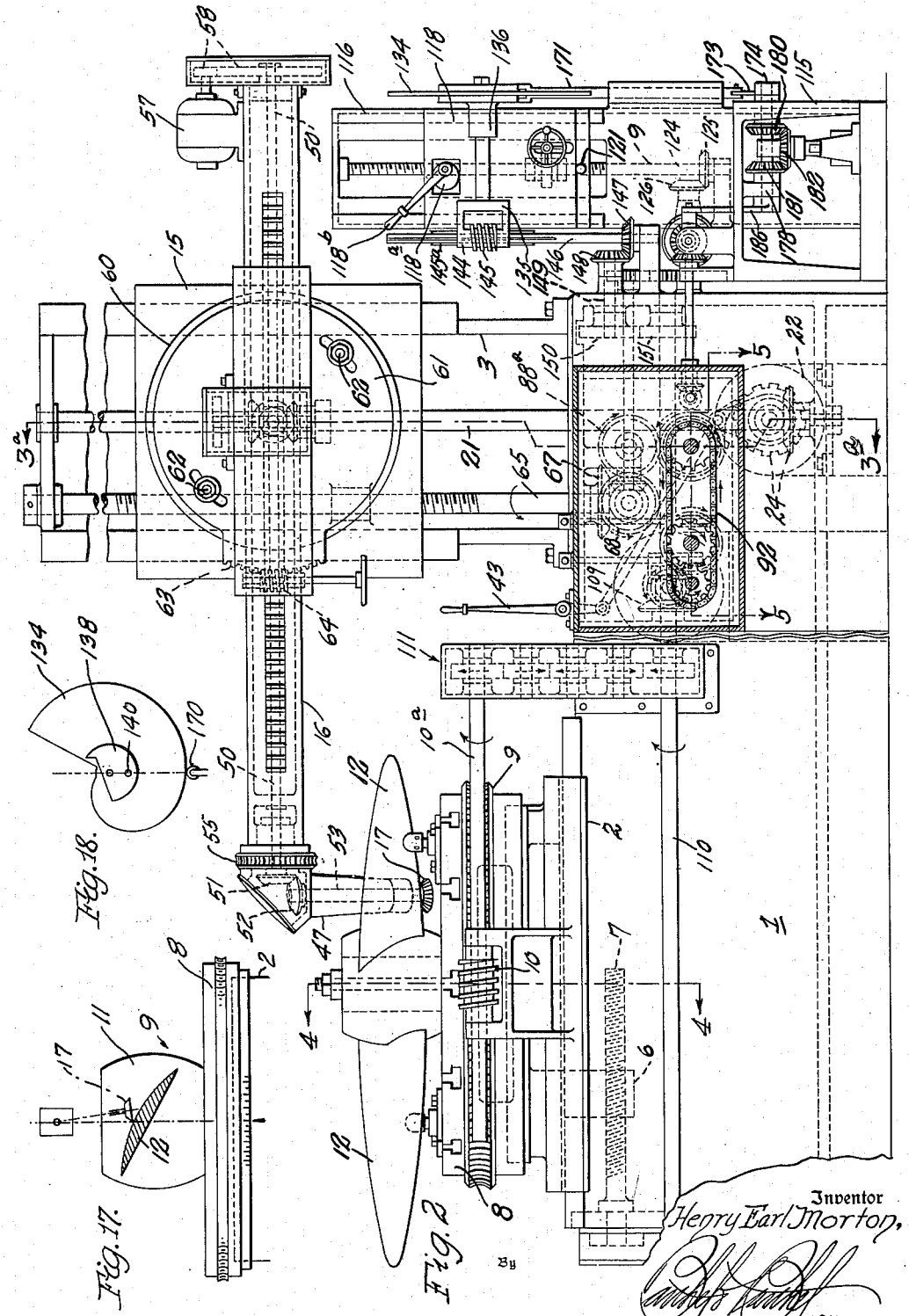

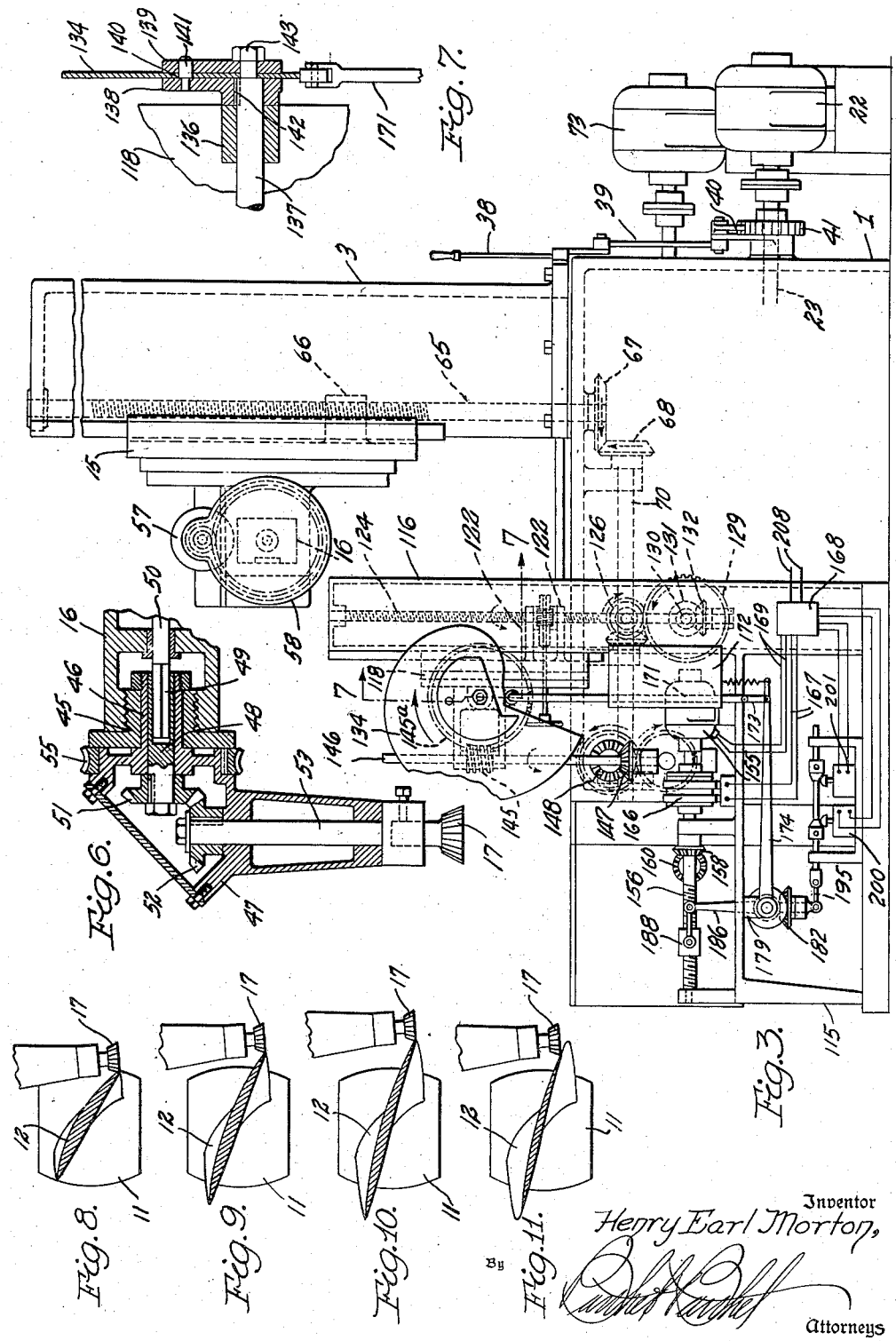

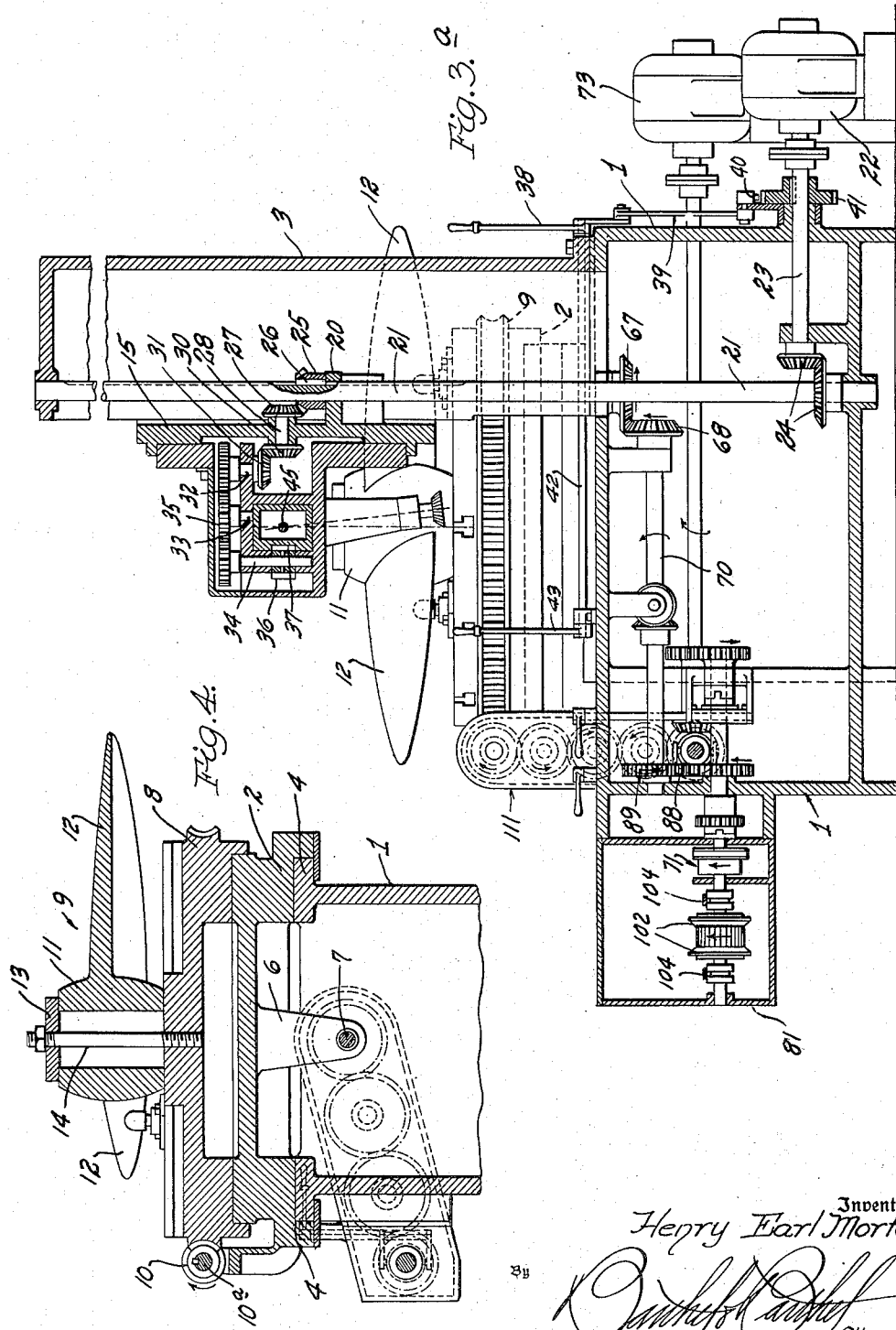

April 29, 1941.   H. E. MORTON   2,239,927
CUTTING AND SHAPING MACHINE
Filed Jan. 3, 1939   5 Sheets-Sheet 5
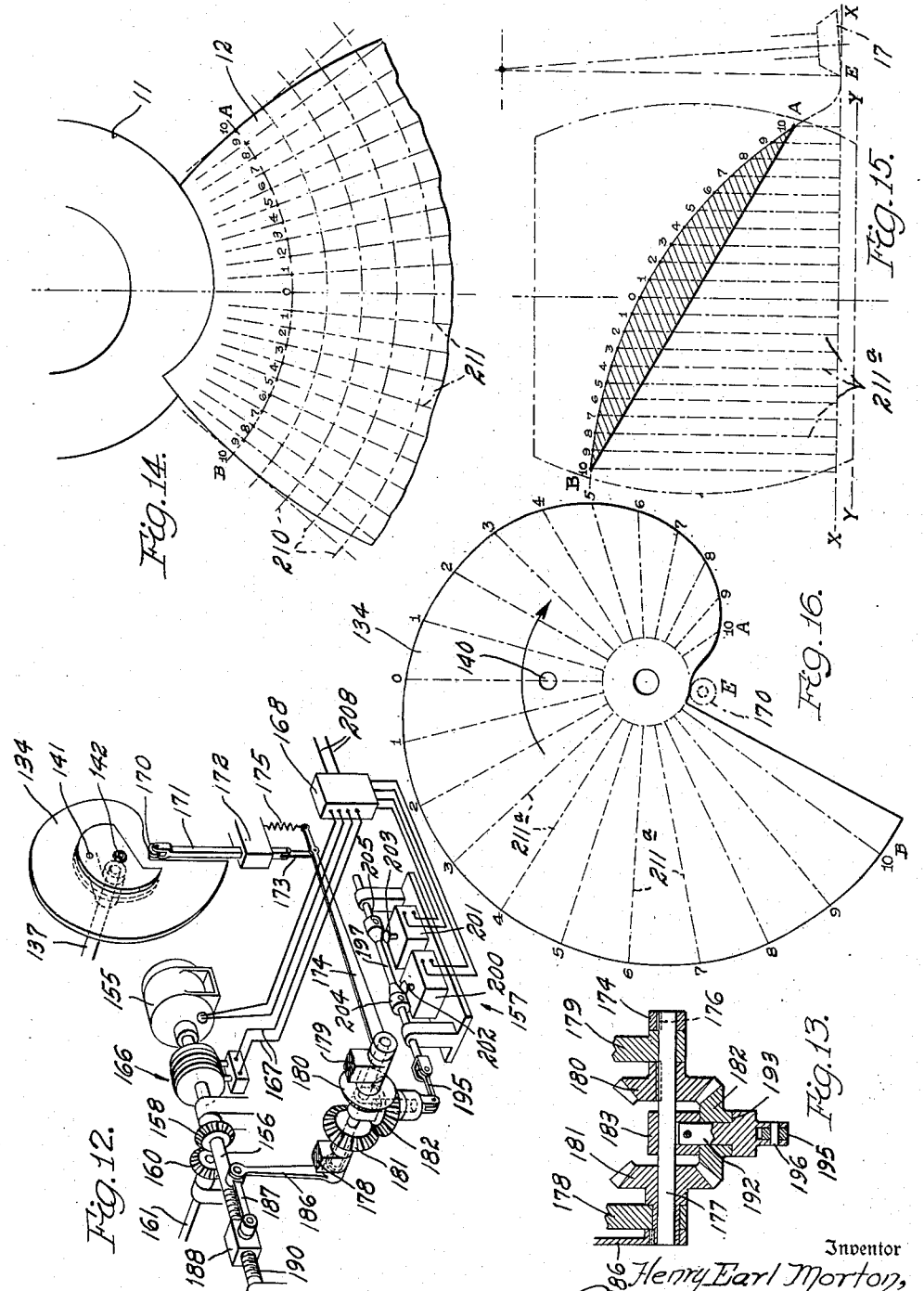
Inventor
Henry Earl Morton,
By
Attorneys Patented Apr. 29, 1941

2,239,927

UNITED STATES PATENT OFFICE 2,239,927

CUTTING AND SHAPING MACHINE

Henry Earl Morton, Muskegon Heights, Mich.

Application January 3, 1939, Serial No. 248,985

9 Claims. (Cl. 90—13.3)

This invention relates generally to machines for cutting material and shaping material, and more particularly to machines for shaping the front and/or rear surfaces of propeller blades.

One of the objects of the present invention is to provide a new and improved machine which will efficiently cut away material and shape an established desired surface of varying rate of progressive curvature.

Another object of the invention is to provide a machine of the above mentioned character which will accurately and quickly cut and shape the front and/or back sides of a propeller blade.

Other objects of the invention will become apparent from the following description taken in connection with the accompanying drawings in which—

Fig. 2 is a view in side elevation of the machine;

Fig. 3 is an end view of the machine;

Fig. 3a is a view similar to Fig. 3 showing certain parts in section and taken along the line and in the direction of the arrows 3a—3a of Fig. 2;

Fig. 4 is a view shown in section of the machine, taken along the line and in the direction of the arrows 4—4 of Fig. 2;

Fig. 6 is a view shown in section of a cutting tool and associated driving mechanism therefor, taken along the line and in the direction of the arrows 6—6 of Fig. 1;

Fig. 7 is a view shown partly in elevation and partly in section of a cam and associated parts, taken along the line and in the direction of the arrows 7—7 of Fig. 3;

Figs. 8, 9, 10 and 11 show blade sections taken along arcuate lines spaced from the center of rotation of the blade and showing the cutting tool at the start of the cutting strokes;

Fig. 12 is a perspective view of the cam and control mechanism actuated thereby to control operation of the cutting tool;

Fig. 13 is a detail view shown in section of gears and associated parts employed in the mechanism shown in Fig. 12;

Fig. 14 shows a portion of a propeller blade and indicates how cuts are taken from and across the blade by the cutting tool;

Fig. 15 is a view of the propeller blade represented as taken along the line A—B of Fig. 14 and showing the path of travel of the cutting tool;

Fig. 16 is a view showing the development of one of a number of the controlling cams designed in accordance with the predetermined curvature of the blade along the line A—B;

Fig. 17 is a detail view to show relationship between the propeller blade, its support and the cutting tool, and Fig. 18 is another detail view of the cam and its follower.

Figures 1, 5:
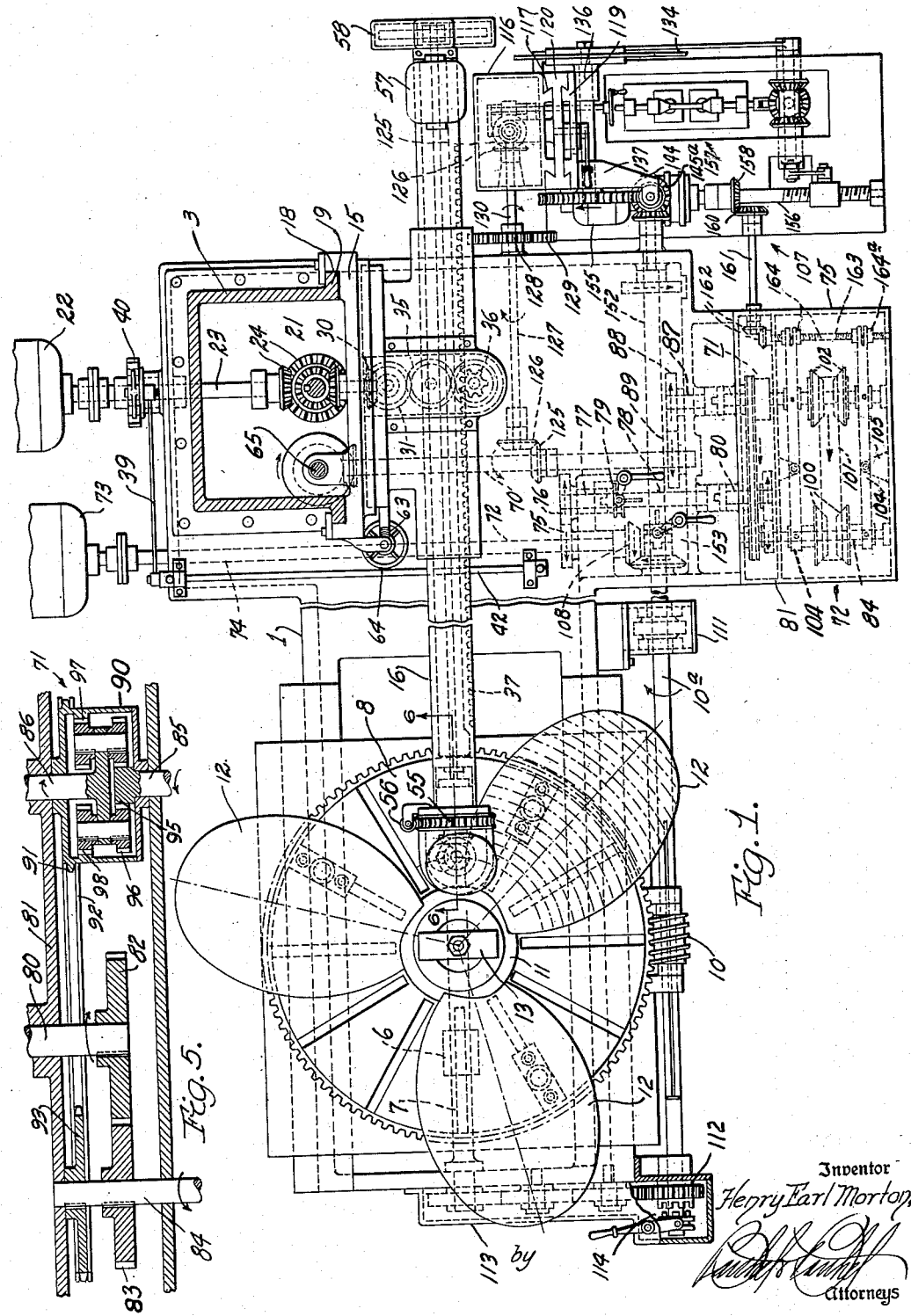
Figure 1 is a top plan view of my machine with parts broken away and in section to show certain details of construction.
Fig. 5 is a view shown in section of a speed differential mechanism taken along the line and in the direction of the arrows 5—5 of Fig. 2.

Referring now in detail to the drawings, the machine includes an elongated base 1 on and adjacent one end of which is mounted a supporting bed 2 and on and adjacent the other end of which is mounted an upright or vertical column 3. Preferably, the supporting bed 2 is movably adjustable longitudinally of the base, or toward and away from the column 3 and to this end, the base 1, Fig. 4, may be provided with guide rails 4 to be slidably received in a guideway provided in the bed 2. Depending from the bed 2, a boss 6 having a threaded aperture receives a horizontally extending screw 7 by means of which the bed 2 may be movably adjusted and held in the desired adjusted position. Mounted on and carried by the bed 2, a rotatable supporting member or table 8 is provided to support the work, such as a propeller 9, to be shaped and the table 8 is circular and is provided on its periphery with gear teeth which mesh with a driving worm gear 10 on a shaft 10a. As usual, the propeller 9 comprises a hub 11 and, in the present illustration, is provided with three blades 12. A clamping plate 13 abutting the upper end of the hub may be tightened down by a screw 14 which may screwthread into the table 8 to secure the propeller tightly thereto.

A vertically movable support or carrier 15 is mounted on the upright column 2 and carries a hollow, elongated ram 16 which extends over and longitudinally of the base 1, the ram 16 supporting at one end thereof a cutting tool 17 for cutting and shaping the propeller blades 12. The carrier 15 is provided with oppositely disposed, spaced slideways 18 in which outturned guides or flanges 19 on the column 3 are received, and integral with the carrier 15 an extended portion or flange 20 projects into the column 3 and is provided with an aperture to receive a vertical shaft 21, Fig. 3. A motor 22 drives a shaft 23 which through bevel gears 24 rotates the vertical shaft 21. Supported on the carrier flange 20, a bevel gear 25 is splined or keyed to the vertical shaft 21, as at 26, and meshes with a bevel gear 27 on one end of a horizontal shaft 28 which is journaled for rotation in a bore in the vertically movable carrier 15. On the other end of the shaft 21, a bevel gear 30 meshes with a bevel gear 31 on the lower end of a vertical shaft 32 which is parallel with other vertical shafts 33 and 34. On the upper ends of the shafts 32, 33 and 34 a train of meshed gears 35 is provided and on the shaft 34 a pinion gear 36 meshes with a gear rack 37 provided on the ram 16. Operation of the motor 22 will, through the various shafts and gears, move the tool carrying ram 16 longitudinally thereof whereby to position the cutting tool 17 with respect to the work or propeller. This power means for positioning the tool 17 is provided for positioning the tool only when the tool is to be moved a substantial distance. For slight movements or adjustments of the cutting tool, a manually operable handle 38 is provided to rotate, the shaft 23. The handle 38 is connected to a link 39 which carries a ratchet 40 cooperable with a gear 41 which is keyed to shaft 23, the position of the ratchet being reversible so as to be able to rotate the shaft 23 in either direction. The handle 38 is mounted on a shaft 42 which extends transversely of the base 1 and on the shaft 42 a second handle 43 may be provided for convenience so that an operator may employ the handle which is closest to him. In the operation of this machine, the cutting tool 17 makes a cut across a propeller blade or other work along or following a predetermined datum line of irregular or progressively curving surface and then by means of one of the handles the ram is moved to position the tool carried thereby for the next cutting stroke, or to follow the next established datum line.

In the end of the hollow ram 16, adjacent the cutting tool 17, is screwthreaded a tubular open ended bearing member 45, Fig. 6, which rotatably receives a reduced tubular portion 46 of a housing 47, and rotatably mounted in the tubular portion 46, a shaft 48 is provided with a recess opening out of its inner end and adapted to receive a square shank 49 of a drive shaft 50 which extends through and longitudinally of the hollow ram 16. An outer end portion of the shaft 48 projects into the housing 47 wherein a bevel gear 51 is keyed thereto and meshes with a similar bevel gear 52 which is keyed to the upper end of a shaft 53 having its axis of rotation transverse to the axis of rotation of aligned shafts 46 and 50, the cutting tool 17 being rigidly secured to the lower end of the shaft 53. Surrounding the housing 47 and rigidly secured thereto, adjacent the bearing member 45, a gear wheel 55 is rotatable by a manually operable worm gear 56 providing for radial adjustment of the tool relative to the ram. As is clearly shown in Fig. 3a and in Fig. 17, the tool 17 is adjusted such that a point on the circular cutting edge thereof is substantially in vertical alignment with the axis of rotation of the hub 11 or of the rotatable supporting table therefor. Mounted on the ram 16 on the opposite side of the column 3 from the cutting tool 17, an electric motor 57 through switch gears 58 drives or rotates the shaft 50 to drive or rotate the cutting tool 17.

The ram 16 is mounted on the vertically movable carrier 15 for adjustment relative thereto to provide for lowering and/or raising of the tool 17 relative to the work, and to this end the carrier is provided with a bore or circular recess 60, Fig. 2, to receive a circular bearing member 61, the member 61 being held in adjusted position by screws 62 screwthreaded into the carrier 15 and extending through slots provided in the bearing member 61. The bear member 61 is provided with a segmental gear 63 with which a manually operable worm gear 64 meshes and by rotation of which the ram 16 may be pivoted to raise and/or lower the cutting tool 17 with respect to the work or propeller blades.

Preferably, the ram carrier 15 is moved vertically by a vertical screw or threaded shaft 65, Fig. 3, which extends upward within the hollow column 3, the carrier being provided with a boss or integral nut 66 projecting into the hollow column and having a threaded aperture or bore to receive the screw. The lower end of the vertical shaft 65 projects slightly below the top wall of the base 1, and secured to the shaft 65 within the hollow base is a bevel gear 67 which meshes with a similar bevel gear 68 secured on a horizontal shaft 70 which extends transversely of the base.

The shaft 70 and therefor the carrier raising and/or lowering screw 65 are operated or driven indirectly by an electric motor 73 through a speed differential mechanism and a speed change mechanism, respectively designated in general by the numerals 71 and 72. The motor 73 drives a shaft 74 secured to which a gear 75 meshes with a gear 76, secured to a shaft 77. A shaft 78, one end of which may be coupled to the shaft 77 by a manually operable clutch 79, is provided and the other end of the shaft 78 is coupled to a stub shaft 80 of the speed differential mechanism 71. The shaft 80, Fig. 5, extends into a housing 81 wherein a gear 82 is keyed to the shaft 80 and meshes with a gear 83 keyed on a shaft 84 which is parallel with the shaft 80 and drives the differential 71 through the speed change mechanism 72.

The differential 71, Fig. 5, may be of any suitable type and, in the present instance, includes a drive shaft 85 and a driven shaft 86, the driven shaft 86 being coupled to a stub shaft 87, Fig. 1, keyed to which a gear 88 meshes with an idler gear 88a which in turn meshes with a gear 89 keyed to shaft 70, Fig. 2. Surrounding and rotatably mounted on the differential shafts 85, 86, a drum 90 is provided with an external sprocket 91 for a drive chain 92 which is driven by a sprocket 93, keyed to the speed change mechanism shaft 84. On the differential drive shaft 85 is the usual, so-called sun gear 95 around and in mesh with which is a plurality of planetary gears 96 which also mesh as at 98 with an internal gear 97 provided on the drum 90.

The speed change mechanism 72, like the speed differential mechanism 71 may be of any suitable type and, in the present instance, includes a pair of cones 100 mounted on the shaft 84, driving through a continuous belt 101, a pair of cones 102 mounted on the differential drive shaft 85, Fig. 1. Each pair of the cones 100 and 102 is splined on its respective shaft such that the cones of each pair may be slidably adjusted longitudinally of the shafts, toward and/or away from each other to change the speed ratio. A pair of spaced levers 104 may be provided for slidably adjusting the cones of each pair and arranged to pivot such that the cones of one pair will be moved toward each other while the cones of the other pair will be moved away from each other. The levers 104 extend longitudinally and on opposite sides of the pairs of cones and may be pivoted intermediate their ends on bosses 105 of the housing 81. Adjacent an end of each of the levers 104 they are pivoted to collars of the cones 100 and adjacent their other ends are pivoted to collars of the other pair of cones 102. Through operation of the levers 104, the change speed mechanism 72 is operated by control mechanism, designated in general by the numeral 107, which is hereinafter described in detail. The motor 73 also drives or rotates the work support table 9, the shaft 74 having thereon a bevel gear 108 meshing with a bevel gear 109 on a shaft 110 which drives the worm gear 10 through a train of gears, designated in general by the numeral 111. On the shaft 110, a gear 112 meshes with one gear of a gear train 113 which is arranged to drive or rotate the work table adjustment screw 7 and a manually operable clutch 114 is provided to disconnect the gear 112 from the gear train 113. The work supporting table 9 is rotated by the motor 73 at a constant rate of speed, whereas, the motor 73 drives shaft 70 which moves the tool carrying ram vertically by rotating vertical screw 65, at varying speeds controlled by the change speed control mechanism 107 in accordance with the contour of the propeller blade along a given datum line.

Referring now to the control mechanism 107, a standard or base 115 is provided and supports a hollow upright column 116 which is provided with guideways 117, Fig. 1, to slidably receive and guide a vertically movable carrier member 118 which comprises a front section 119 and a rear section 120. The carrier section 120 is provided with an abutment or pin 121, Fig. 2, on which the other section or section 119 is adapted to seat so that the sections may move vertically together which is the case during the cutting operation of the tool 17. A pair of vertically spaced bosses 122, integral of the rear carrier section 120 projects through a vertically elongated aperture or slot into the hollow column 116 wherein the bosses are provided with aligning threaded apertures to receive a vertical screw 124 which is operable to move the carrier vertically. The screw 124 is rotated by the motor 73 off of the variable speed shaft 70. On the shaft 70 a bevel gear 125 meshes with a similar bevel gear 126 on a shaft 127 on which a relatively small gear 128 meshes with a relatively large gear 129 on a shaft 130 which is located below and extends parallel with shaft 127. On shaft 127, a bevel gear 131 meshes with a bevel gear 132 on the vertical screw 124, adjacent the lower end thereof. Thus it will be seen, that from the variable speed shaft 70, the main tool carrier 15 and the carrier 118 are moved vertically in a predetermined synchronized relation. Or in other words there is selected a ratio between the distance that the main carrier moves and the distance that carrier 116 moves, this ratio being determined by the various gears.

The carrier 118 is provided to carry, one at a time, cams or templates, one of which is shown at 134, mounted on the carrier for vertical movement therewith. A pair of horizontally spaced bosses 135, 136, integral with the front carrier section 119 have aligning bores to receive and support a shaft 137 on one end of which the cam 134 is mounted, the cam, Fig. 7, preferably being provided with plates 138, 139, on opposite sides thereof. In the present instance, the cam or cams 134 are provided each with a locating aperture 140 to align with apertures in the plates 138, 139 and receive a dowel pin 141. The inner plate 138 is preferably keyed to the shaft 137, as at 142, and an outer end portion of the shaft 137 may be reduced and threaded to receive a nut 143 for rigidly securing the plates and cam together and to the shaft 137.

Extending from and integral with the carrier boss 137, an arm 144 carries a worm gear 145 in mesh with a worm wheel 145 which may be keyed or be otherwise secured onto the shaft 137 adjacent the end thereof opposite the end on which the cam 134 is secured. The worm gear 145 is provided on a vertical shaft 146 which extends through an opening in the arm 144, the shaft 146 having longitudinal splines 147 cooperable with internal splines in the arm opening to permit vertical movement of the shaft and worm gear with the cam or template carrier 118. On the lower end of the shaft 146, a bevel gear 147 meshes with a similar bevel gear 148 on a horizontal shaft 149 on which a second gear 150 meshes with a gear 151 on a shaft 152 which extends parallel with horizontal shaft 149 which is coupled to the table driving shaft 10a by a manually operable clutch 153. Thus, it will be seen that from motor driven shaft 74, both the work table 9 and the cam or template 134 are arranged to be rotated at constant speed, by the motor 73.

Mounted on the base 115, a reversible electric motor 155 is adapted to drive or rotate a shaft 156 to actuate the speed change mechanism 72, operation of the motor 155 being controlled by switch mechanism designated in general by the numeral 157, see Fig. 12. Keyed or otherwise secured to the shaft 156 for rotation therewith, a bevel gear 158 meshes with and drives a similar bevel gear 160 on a shaft 161 which is connected by bevel gears 162 to a rotatable screw or threaded shaft 163, connected to corresponding ends 165, of the speed change device operating levers 104. One end portion of the screw or shaft 163 is provided with a right hand thread for a correspondingly threaded collar 164 to which one end of one of the levers 104 is pivoted and the other end of the screw 163 is provided with a left hand thread for an internally threaded collar 164a to which the other lever end 165 is pivotally connected. Upon rotation of the screw 163 in one direction the speed change device levers 104 are operated whereby to increase the speed of shaft 70 thereby tending to raise the cutting tool 17 and conversely, upon rotation of the screw 163 in the opposite direction the speed change drive is actuated to decrease the speed of shaft 70 to lower the cutting tool 17 with respect to the work.

In order to insure that the screw 163 will stop rotating substantially immediately upon cutting out of the motor 155, a magnetically operated clutch, designated in general by the numeral 166, is provided for coupling and/or uncoupling the motor shaft and shaft 156, the clutch being controlled by the switch mechanism 157. From the magnetic clutch 166, which may be of any of the well known types, lead wires 167 lead to a terminal box 168 at which lead wires 169 from the motor 155 also terminate.

As previously mentioned the carrier 118 comprises a front section 119 and a rear section 120 which normally or during operation of the machine move vertically together but are also movable relative to each other. The front section, Fig. 2, is movable relative to the rear section so that after a cutting stroke of the tool 17, the tool may be raised for return to its starting position. To this end, a cam 118a may be provided to raise the front carrier section 119 and may be operated manually by a hand lever 118b. Raising of the carrier section 119 of course raises the main cam 134 which as will later more clearly be seen raises the tool 17 a corresponding distance above the work or propeller blade.

The cam 134 is adapted to actuate a follower member 170, preferably a roller which is rotatably mounted on the upper end of a reciprocal link or push rod 171, the rod 171 being vertically, reciprocally guided in an opening in an extended wall portion 172 of the column 116. At its lower end, the push rod 171 is pivotally connected to one end of a link 173 of which the other end is pivoted to a lever 174 adjacent the free end thereof. One end of a helical coil spring 175 is connected to the free end of the lever 174 and the other end of the spring is anchored to the column extension wall 172, the spring being under tension and acting to hold the follower 170 in contact with the cam surface of the cam or template 134. The other end of the lever 174 is keyed, as at 176, Fig. 13, to one end of a shaft 177 which is rotatably supported in bearings provided in spaced bosses 178, 179 which are integral with and depend from the column base 115.

Mounted on the shaft 177 between the bosses 178 and 179, a pair of spaced bevel gears 180, 181 mesh with a third bevel gear 182 which is suspended from the shaft 177 by a supporting member 183 which is rotatably mounted on the shaft between gears 180, 181 to permit the gear 183 to pivot about the longitudinal axis of the shaft. The gear 181 is loosely mounted on the shaft 177 and is provided with a reduced portion 185 to the outer end of which is keyed one or the lower end of a lever 186. To the upper end of the lever 186 is pivotally connected, one end of a link or arm 187, the other end of which arm is pivotally connected to a follower 188 in the form of a block having therethrough a threaded bore to receive the threaded portion 190 of the shaft 156 which is driven or rotated by the electric motor 155. When the shaft 156 is not being rotated, it will be seen that the bevel gear 181 will be locked against rotation.

The intermediate gear 182 is freely rotatable on a pin 192, the upper end of which is connected to the supporting member 183, the pin 192 having an upwardly facing shoulder 193 on which the gear 182 seats. At its lower end, the pin 192 is bifurcated to receive one end of a link 195 which is pivoted to the pin 192 by a pivot pin 196. The other end of the link 195 is pivotally connected to a rod 197 which is mounted for endwise sliding movement in bores provided in spaced uprights 198 which are integral with a base 199. Mounted on the base 199 is a pair of spaced controls or switches 200 and 201 which are biased to normally open the circuits of the motor 155 and the magnetically operated clutch 166. These switches 200, 201 may be of any well known suitable type and in the present illustration have upwardly directed opening stems 202 and 203 respectively. Mounted on and secured to the slidable or reciprocal rod 197 is a pair of spaced, conical-shaped actuators 204, 205 adapted to respectively actuate the switches 200 and 201. The switches 200 and 201 are respectively connected by lead wires 206 and 207 to the terminal box 168 to which main lead wires 203 connect.

Referring now more particularly to Fig. 14, there is shown in part one of the propeller blades to be cut and shaped to substantially the desired final shape. The number of necessary cuts to be made by the tool 17 is determined and these cuts are represented in Fig. 14 by the radially spaced dot and dash lines 210 which are arcs of circles having a common center which is the center of the propeller hub 11 or center of rotation of the supporting table 9. For each of the cuts taken across the blade, represented by the dot and dash lines 210 a separate cam is designed, one of which is shown and described and is designated by the numeral 134, as previously mentioned. To develop the cam 134, a predetermined number of lines 211 equally and radially spaced with respect to the center of the hub 11 as shown in Fig. 14 and a like number of radial and corresponding lines 211a, as shown in Fig. 16 are drawn to develop the cam. The cam 134 of Fig. 16 is developed in accordance with the datum or line A, B and in Fig. 15 is shown the corresponding desired established blade curvature along the line A, B. With some convenient base line such as the line X—X, Fig. 15, which corresponds to the dot and dash circle of Fig. 16, it will be seen that the points 1 to 10 on opposite sides of the zero point may be transferred to the cam development of Fig. 16 to determine the proper curvature of the cam surface. Line Y—Y represents the low point of the cam or starting position of the cutting tool 17. The points along the curvature of the blade or line A, B, Fig. 15, have been numbered from the intermediate zero point because approaching the zero point, the rate of rise of the tool 17 increases while beyond the zero point the rate of rise of the tool 17 decreases. In Figs. 8, 9, 10, and all are shown sections of the blade 12 taken along different lines from the center of the blade hub 11, and for each section, a separate cam is developed.

*Operation*

The various devices, of course, have related or corresponding starting positions to which they are returned after a cut has been taken or in which they are set at the start of a cutting operation. For example, the table is rotated to position one of the blades in an established or predetermined position which may be conveniently found or determined by the use of any suitable scale or indicator. Also, the cam 134 is rotated to a position corresponding to the position of the support or table 9 with the follower on the low point of the cam as shown in Fig. 16. With the parts and devices in their properly related starting positions, the main drive motor 73 is started and as previously mentioned, the motor 73 rotates the work supporting table 9 at a constant rate of speed through driving connections including shafts 74, 110 and 10a. Also, the motor 73 drives or rotates shaft 70 to raise the carrier ram 16 to raise the cutting tool 17, shaft 70 being driven through the speed change mechanism 72 and the speed differential mechanism 71 at a variable speed corresponding to the established curvature of a datum or cut line. In addition, the motor 73 through its driving of shaft 127 raises the cam carrier 118 which moves vertically in a definite ratio or relation to movement of the main carrier 15 to the tool 17 carried thereby. The electric motor 155 under the control of the switch mechanism 157 rotates shaft 156 to actuate the speed change mechanism operating arms 104, the switch mechanism 157 being actuated by the cam 134 and also by the electric motor 155. Thus, on starting of motors 73 and 155 and the tool drive motor 57, the work or propeller support rotates at constant speed toward and against the rotating tool, the tool being raised as the work support rotates. The cam 134 is provided with a dwell from which the cam has a sudden rise to lift the tool 17 up to the starting point of the cutting operation, as shown in Figs. 15 and 16. Assume that the reversible control motor 155, Fig. 12, is stopped. Under this condition, the worm traveler 188 locks gear 181 against movement with the result that as the cam 134 rotates and depresses the cam follower 170, lever 174 is pivoted downwardly which rolls gear 182 in a direction such that the switch rod 197 is moved in a direction to close switch 201. Closing of switch 201 energizes and starts the motor 155 and also energizes the magnetically operated clutch 166 which then acts to couple the motor shaft to the shaft 156. Rotation of the shaft 156 in one direction imparts rotation to transverse shaft 161, actuating the operating levers 104 of the speed change mechanism 72 to increase the rate of rise of the cutting tool 17 with corresponding increase in rate of rise of the cam 134. Operation of the motor 155, rotating screw 190 causes the traveler 188 to move and through lever 186, rotates gear 181 which causes gear 182 to move bodily in a direction to shift or return the switch rod 197 to permit switch 201 to open. Thus, it will be seen that as the cam 134 rotates, it also rises bodily and when the rate of the cam rise is such that the cam will depress the follower 170 and close switch 201, the motor 155 will be started to increase the rate of rise of the cam which will correspondingly decrease the rate of rise of the cutting tool 17. As soon as the motor 155 starts to operate, the speed change mechanism is adjusted by levers 104 to increase the speed and also, the lever 186 is actuated to open switch 201 and stop the motor 155. The motor 155 will only be stopped for a short time interval during which the cam 134 will rise at a constant rate and during which the cutting tool 17 will cut along a line tangent to the curvature of the datum line. When the motor is again started, the rate of rise of the cam and tool is again changed. Traversing the blade, the cutting tool 17 will make a series of cuts along lines tangent to the curvature of the datum line, the cuts being so close together that the surface will be a substantially smooth curve. It will be seen that every time the motor 155 is started, the rate of rise of the cam and tool is changed whereby the desired progressively curving surface is cut and shaped.

The switch 200 only comes into function when the curve is one in which the variable rate of change is increasing instead of decreasing. For example, switch 200 would be in control if the tool started from point B, Fig. 15, and worked downward for under this condition it will be seen that the variable rate of change is increasing from B to A. After the blade has been cut along one datum line, the machine is reversed and another cam, corresponding to the next datum line along which the blade is to be cut, is mounted on the machine. Thus, by taking a series of cuts across the blade the excess material is removed and the blade is shaped to substantially its final form.

What I claim is:

1. In a machine of the character described, a movable supporting member for material to be cut and shaped along a curved datum line, a tool member to cut the material and movable relative thereto, one of said members being movable at a constant rate of speed and the other of said members being movable at a variable rate of speed, means to move said members, means to change the rate of movement of said other member, means controlling said rate changing means, rotatable and bodily movable cam means operable in response to change in rate of movement of said other member to actuate said controlling means, and means operable in response to said rate changing means to actuate said controlling means.

2. In a machine of the character described, a movable supporting member for material to be cut and shaped along a predetermined curved datum line, a tool member to cut the material, one of said members being movable relative to the other of said members during the cutting operation, means to vary the rate of movement of said one member, means operable to control said rate varying means, rotatable and rectilinearly movable cam means operable to actuate said control means, and an operating member operated by said cam means and operatively connected to said control means.

3. In a machine of the character described, a rotatable supporting member for material to be cut and shaped along a predetermined curved datum line, means to rotate said supporting member, a rotatable tool for cutting the material, said tool being bodily movable away from the material, means to move said tool away from the material, means to vary the rate of movement of said tool away from the material, means to control said rate varying means, means operable in response to rotation of said supporting member and material to actuate said control means in accordance with the curvature of the datum line, and means operable by said last-named means to actuate said control means.

4. In a machine of the character described, a rotatable support for material to be cut along a curved datum line, means to rotate said support at a substantially constant rate of speed, a tool for cutting the material, means for driving said tool, said tool being bodily vertically movable, means to move said tool vertically, change speed mechanism to vary the rate of movement of said tool, speed differential mechanism operatively connecting said change speed mechanism and said tool moving means, control means for said speed change mechanism, means to actuate said speed change mechanism, cam means synchronized with movement of said tool and operable to actuate said control means, and means operable in response to operation of said speed change actuating means to actuate said control means.

5. In a machine for cutting excess material from a propeller blade and shaping a progressively curving surface thereon along a datum line, a rotatable support for the propeller blade, means to rotate said support and blade at a substantially constant rate of speed, a rotatable cutting tool, means to rotate said tool, said tool being bodily movable relative to the blade, speed change mechanism for changing the rate of movement of said tool, speed differential mechanism operatively connecting said speed change mechanism and said tool, a motor to actuate said change speed mechanism to vary the rate of movement of said tool relative to the blade, switch means controlling said motor, a cam having a cam surface substantially corresponding to the curvature of the datum line and operable to actuate said switch means, and means responsive to operation of said motor to actuate said switch means.

6. In a machine for cutting excess material from a propeller blade and shaping a progressively curving surface thereon along a datum line, a rotatable support for the propeller blade, means to rotate said support and blade at a substantially constant rate of speed, a rotatable cutting tool, means to rotate said tool, said tool being bodily movable relative to the blade, speed change mechanism for changing the rate of movement of said tool, speed differential mechanism operatively connecting said speed change mechanism and said tool, a motor to actuate said change speed mechanism to vary the rate of movement of said tool relative to the blade, switch means controlling said motor, a cam having a cam surface substantially corresponding to the curvature of the datum line and operable to actuate said switch means, means responsive to operation of said motor to actuate said switch means, and electrically operated clutch means operatively connecting said speed change mechanism and said motor and controlled by said switch means.

7. In a machine of the character described, a rotatable support, a propeller blade mounted on said support for rotation therewith, drive means to rotate said support at constant speed, a cutting tool for cutting across said blade along a progressively curving datum line, a substantially vertically movable support for said tool, means to elevate said support and tool and driven by said drive means, speed change mechanism operatively connected to said drive means, speed differential mechanism operatively connecting said speed change mechanism and said movable support, a second substantially vertically movable support operatively connected to said speed differential mechanism, a cam carried by said second-named support and rotated by said constant speed drive means, said cam having a cam surface substantially corresponding in contour to the curvature of the datum line, a cam follower actuated by said cam, operating means for said speed change mechanism, means to actuate said operating means, control means for said actuating means and operatively connected to said cam follower, and means operable by said actuating means to actuate said control means.

8. In a machine of the character described, a movable supporting member for material to be cut along a predetermined progressively curving datum line, a rotatable tool to cut the material and bodily movable relative to the material, a frame, a vertically movable carrier guided on said frame and carrying said tool, a second frame, a vertically movable carrier guided on said second-named frame, a cam carried by said second-named carrier, power means for moving said first-named carrier and said second-named carrier, speed change mechanism driven by said power means, speed differential mechanism operatively connecting said speed change mechanism to said first and second-named carriers, and means for controlling said speed change mechanism and controlled by said cam.

9. In a machine of the character described, a movable supporting member for material to be cut along a predetermined progressively curving datum line, a rotatable tool to cut the material and bodily movable relative to the material, a frame, a vertically movable carrier guided on said frame and carrying said tool, a second frame, a vertically movable carrier guided on said second-named frame, a cam carried by said second-named carrier, power means for moving said first-named carrier and said second-named carrier, speed change mechanism driven by said power means, speed differential mechanism operatively connecting said speed change mechanism to said first and second-named carriers, means for controlling said speed change mechanism and controlled by said cam, an electric motor operable to control said speed change mechanism, switch means controlling said motor and actuated by said cam, and means actuated by said motor for controlling said switch means.

HENRY EARL MORTON.